United States Patent
Tonar et al.

[11] Patent Number: 6,064,509
[45] Date of Patent: May 16, 2000

[54] CLIP FOR USE WITH TRANSPARENT CONDUCTIVE ELECTRODES IN ELECTROCHROMIC DEVICES

[75] Inventors: William L. Tonar; Fred T. Bauer, both of Holland; Dan J. Bostwick, Grandville; Joel A. Stray, Holland, all of Mich.

[73] Assignee: Gentex Corporation, Zeeland, Mich.

[21] Appl. No.: 08/917,643

[22] Filed: Aug. 22, 1997

[51] Int. Cl.[7] .................................................... G02F 1/153
[52] U.S. Cl. ....................... 359/272; 359/274; 359/265; 359/267; 439/67; 439/493; 439/857
[58] Field of Search .................................. 359/272, 273, 359/275, 818, 265, 267; 439/67, 493, 495, 857

[56] References Cited

U.S. PATENT DOCUMENTS

| | | | |
|---|---|---|---|
| 4,955,827 | 9/1990 | Roy | 439/595 |
| 5,110,761 | 5/1992 | Kalfus et al. | 437/182 |
| 5,202,787 | 4/1993 | Byker et al. | 359/267 |
| 5,216,536 | 6/1993 | Agrawal et al. | 359/274 |
| 5,237,742 | 8/1993 | McClune | 29/882 |
| 5,448,397 | 9/1995 | Tonar | 359/272 |
| 5,496,182 | 3/1996 | Yasumura | 439/67 |
| 5,499,924 | 3/1996 | Arisaka et al. | 439/67 |
| 5,529,502 | 6/1996 | Peltier et al. | 439/67 |
| 5,554,056 | 9/1996 | Henricus op ten Berg | 439/857 |
| 5,608,434 | 3/1997 | Wilson et al. | 439/67 |

FOREIGN PATENT DOCUMENTS

| | | | |
|---|---|---|---|
| 61-61726 | 4/1986 | Japan . | |
| 63-137323 | 9/1988 | Japan | G02F 1/17 |
| 7-40977 | 9/1995 | Japan | G02F 1/155 |

OTHER PUBLICATIONS

R. Mroczkowski, "Concerning 'Hertz Stress' as a Connector Design Parameter", 1991.
H. S. Fluss, "Hertzian Stress as a Predictor of Contact Reliability", 1990.
E. A. Kantner et al., "Hertz Stress as an Indicator of Connector Reliability", 1989.

*Primary Examiner*—Loha Ben
*Attorney, Agent, or Firm*—Brian J. Rees

[57] ABSTRACT

An improved electrochromic device for rearview mirror for motor vehicles and windows, the device incorporating an improved conductive clip comprising an elongated unitary member having a resilient backwall section connecting a plurality of first resilient sections separated from one another by a plurality of recesses and a plurality of second resilient sections Laterally spaced from the plurality of first resilient sections and separated from one another by a plurality of recesses, where each of the plurality of first resilient sections have at least one dimple adapted to bear against a surface of an electrozhromic device that is coated with a transparent conductor, and where each of the plurality of second resilient sections are adapted to bear against another surface of said electrochromic device, where said unitary member is capable of bending in three directions and supplying a potential to the transparent conductor in a stable manner for long periods of time. The clip may optionally contain features included into either the backwall section or the first or second sections that allow the clips to snag the bezel of an electrochromic mirror to more effectively hold the bezel on the mirror element, or to snag the glass element of an electrochromic device to more effectively hold the clip on the glass.

31 Claims, 6 Drawing Sheets

*Prior Art*

CLIP FOR USE WITH TRANSPARENT CONDUCTIVE ELECTRODES IN ELECTROCHROMIC DEVICES

BACKGROUND OF THE INVENTION

This invention relates to an improved clip for use with transparent conductive metal oxide electrodes in electrochromic devices and, more particularly, to an improved clip comprising a dimple that has high contact stability over long periods of time when in contact with a metal oxide film, even when operated at low voltages and low currents.

Heretofore, various automatic rearview mirrors for motor vehicles have been devised which automatically change from the full reflectance mode (day) to the partial reflectance mode(s) (night) for glare protection purposes from light emanating from the headlights of vehicles approaching from the rear. The electrochromic mirrors disclosed in U.S. Pat. No. 4,902,108, entitled "Single-Compartment, Self-Erasing, Solution-Phase Electrochromic Devices Solutions for Use Therein, and Uses Thereof", issued Feb. 20, 1990, to H. J. Byker; Canadian Patent No. 1,300,945, entitled "Automatic Rearview Mirror System for Automotive Vehicles", issued May 19, 1992, to J. H. Bechtel, et al.; U.S. Pat. No. 5,128,799, entitled "Variable Reflectance Motor Vehicle Mirror" issued Jul. 7, 1992, to H. J. Byker; U.S. Pat. No. 5,202,787, entitled "Electro-Optic Device" issued Apr. 13, 1993, to H. J. Byker, et al.; U.S. Pat. No. 5,204,778, entitled "Control System For Automatic Rearview Mirrors", issued Apr. 20, 1993, to J. H. Bechtel; U.S. Pat. No. 5,278,693, entitled "Tinted Solution-Phase Electrochromnic Mirrors", issued Jan. 11, 1994, to D. A. Theiste, et al.; U.S. Pat. No. 5,280,380, entitled "UV-Stabilized Compositions and Methods", issued Jan. 18, 1994, to H. J. Byker; U.S. Pat. No. 5,282,077, entitled "Variable Reflectance Mirror", issued Jan. 25, 1994, to H. J. Byker; U.S. Pat. No. 5,294,376, entitled "Bipyridinium Salt Solutions", issued Mar. 15, 1994, to H. J. Byker; U.S. Pat. No. 5,336,448, entitled "Electrochromic Devices with Bipyridinium Salt Solutions", issued Aug. 9, 1994, to H. J. Byker; U.S. Pat. No. 5,434,407, entitled "Automatic Rearview Mirror Incorporating Light Pipe", issued Jan. 18, 1995, to F. T. Bauer, et al.; U.S. Pat. No. 5,448,397, entitled "Outside Automatic Rearview Mirror for Automotive Vehicles", issued Sep. 5, 1995, to W. L. Tonar; and U.S. Pat. No. 5,451,822, entitled "Electronic Control System", issued Sep. 19, 1995, to J. H. Bechtel, et al., each of which patents is assigned to the assignee of the present invention and the disclosures of each of which are hereby incorporated herein by reference, are typical of modern day automatic rearview mirrors for motor vehicles. Such electrochromic mirrors may be utilized in a fully integrated inside/outside rearview mirror system or as an inside or an outside rearview mirror system. In general, in automatic rearview mirrors of the types disclosed in the above-referenced U.S. and Canadian Patents, both the inside and the outside rearview mirrors are comprised of a relatively thin electrochromic medium sandwiched and sealed between two glass elements.

In most cases, when the electrochromic medium which functions as the media of variable transmittance in the mirrors is electrically energized, it darkens and begins to absorb light, and the more light the electrochromic medium absorbs the darker or lower in reflectance the mirror becomes. When the electrical voltage is decreased to zero, the mirror returns to its clear high reflectance state. In general, the electrochromic medium sandwiched and sealed between the two glass elements is comprised of solution-phase, self-erasing system of electrochromic materials, although other electrochromic media may be utilized, including an approach wherein a tungsten oxide electrochromic layer is coated on one electrode with a solution containing a redox active material to provide the counter electrode reaction. When operated automatically, the rearview mirrors of the indicated character generally incorporate light-sensing electronic circuitry which is effective to change the mirrors to the dimmed reflectance modes when glare is detected, the sandwiched electrochromic medium being activated anid the mirror being dimmed in proportion to the amount of glare that is detected. As glare subsides, the mirror automatically returns to its normal high reflectance state without any action being required on the part of the driver of the vehicle.

The electrochromic windows of the invention have similar construction and operation as the electrochromic mirrors of the invention except that the size or area can be much larger and a reflector layer is not needed.

For mirrors the electrochromic medium is disposed in a sealed chamber defined by a transparent front glass element, a peripheral edge seal, and a rear mirror element having a reflective layer. Conductive layers are provided on the inside of the front and rear glass elements, the conductive layer on the front glass element being transparent while the conductive layer on the rear glass element may be transparent or may be semi-transparent or opaque and may also have reflective characteristics and function as the reflective layer for the mirror assembly. The conductive layers on both the front glass element and the rear glass element are connected through clips to electronic circuitry which is effective to electrically energize the electrochromic medium to switch the mirror to nighttime, decreased reflectance modes when glare is detected and thereafter allow the mirror to return to the daytime, high reflectance mode when the glare subsides as described in detail in the aforementioned Patents. For clarity of description of such a structure, the front surface of the front glass element is sometimes referred to as the first surface, and the inside surface of the front glass element is sometimes referred to as the second surface. The inside surface of the rear glass element is sometimes referred to as the third surface, and the back surface of the rear glass element is sometimes referred to as the fourth surface.

Conductive clips are used to impart a potential from a power supply to the conductive materials. The vast majority of prior art clips used in the electronics industry, however, are designed to provide adequate electrical contact to metals. Typically a stable electrical contact is maintained during wiping contact where there is repeated opening and closing of the point of contact between the clip and the metal, or where the high current or voltage "burns" through any oxides that are formed on the metal.

Figure 1:
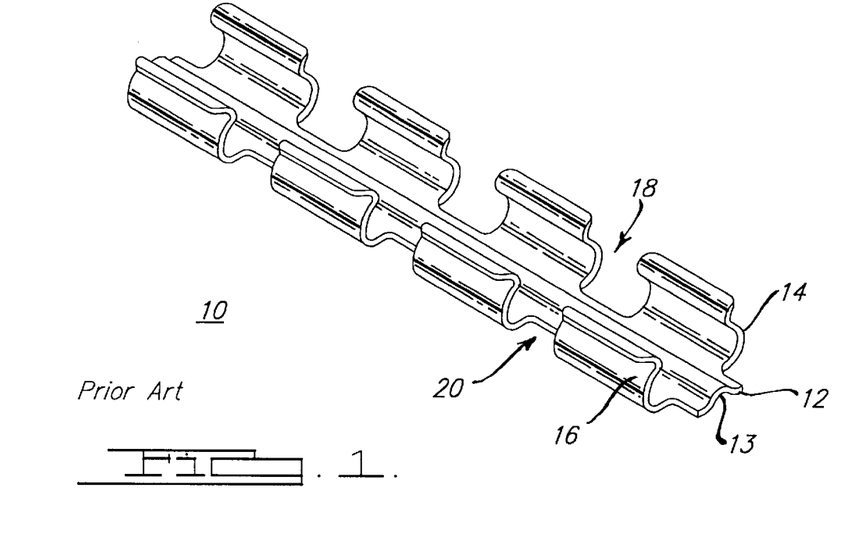
FIG. 1 is a perspective view of a prior art clip.

A prior art, ribbed, clip 10 used to contact metal oxides is shown in FIG. 1 and is generally "U" shaped having a grooved back 12 and two sides (14 and 16). Recesses (18 and 20) are disposed in the sides to allow for flexibility and a rib or groove 13 is formed in the back to provide some stiffness and rigidity to the clip 10. These prior art clips exhibit a steep rise in contact resistance over time because of poor contact stability with the transparent conductors within electrochromic devices. This is especially true for low cost atmospheric applied CVD coatings, such as LOF Tech glass where the metal oxide surface is hard and very rough. This rise in contact resistance causes a deterioration in the performance of an electrochromic device by decreasing coloring speed and coloring uniformity and, for electrochromic mirrors, decreasing low end reflectivity. These poor connections typically do not cause catastrophic failures because there is so much redundancy due to the many points of contact around the periphery of an electrochromic device. Most automotive electrochromic mirrors produced today are interior mirrors wherein the clips are not exposed directly to moisture or corrosive road salt environments. Most outside electrochromic mirror assemblies in production today incorporate a means for sealing or protecting the clip from direct exposure to moisture or salt spray by potting the clips in a polymer or adhesive (see, for example, U.S. Pat. No. 5,448, 397, entitled "Outside Automatic Rearview Mirror for Automotive Vehicles " to W. L. Tonar et al.), or creating a sealed chamber (see, for example, U.S. patent application Ser. No. 5,216,536, entitled "Encapsulated Electrochromic Device and Method for Making Same " to A. Agrawal et al.). Further, because the lifetime of the only commercially available electrochromic devices (eyeglasses and automobile mirrors) does not extend much past 10 years, this redundancy has eliminated any catastrophic failures. However, as electrochromic windows become available (whose lifetime must be 20–30 years), these poor electrical connections become much more important. One reason for this is that for a large window to color evenly, there must be good contact all around the periphery and if a portion of the individual connections fail, then the window will color unevenly which is very aesthetically displeasing to consumers. It is also desirable to have designs where clip protection by potting in a polymer or adhesive or creating a sealed chamber is not required.

Consequently, it is desirable to provide an improved conductive clip comprising a dimple that has high contact stability over long periods of time when supplying potential to at least one transparent conductor within an electrochromic device, even when operated at low voltages and low currents.

OBJECTIVES OF THE INVENTION

Accordingly, a primary objective of the present invention is to provide an improved conductive clip comprising a dimple that has high contact stability over long periods of time when supplying potential to at least one transparent conductor within an electrochromic device, even when operated at low voltages and low currents.

Another objective of the present invention is to provide an improved conductive clip comprising features that allow the clip to snag the bezel of an electrochromic mirror to more effectively hold the bezel on the mirror element, or to snag the glass element of an electrochromic device to more effectively hold the clip on the glass.

SUMMARY OF THE INVENTION

The above and other objectives, which will become apparent from the specification as a whole, including the drawings, are accomplished in accordance with the present invention by providing an improved conductive clip comprising an elongated unitary member having a resilient backwall section connecting a plurality of first resilient sections separated from one another by recesses and a plurality of second resilient sections laterally spaced from the first resilient sections and separated from one another by recesses. Each of the first resilient sections has at least one dimple adapted to bear against a surface of an electrochromic device that is coated with a transparent conductor, and each of the plurality of second resilient sections is adapted to bear against another surface of the electrochromic device and may optionally have at least one dimple. The elongated unitary member is capable of bending in three directions and supplying potential to the transparent conductor in a stable manner for long periods of time. The elongated unitary member may optionally contain features included into either the backwall section or the first or second sections that allow the clips to snag the bezel of an electrochromic mirror to more effectively hold the bezel on the mirror element, or to snag the glass element of an electrochromic device to more effectively hold the clip on the glass. The elongated unitary member may also be fabricated from a variety of materials that possess sufficient resiliency, strength, conductivity and corrosion resistance.

BRIEF DESCRIPTION OF THE DRAWINGS

The subject matter which is regarded as the invention is particularly pointed out and distinctly claimed in the concluding portion of the specification. The invention, together with further objectives and advantages thereof, may best be understood by reference to the following description taken in connection with the accompanying drawings, where like numerals represent like components, in which:

DETAILED DESCRIPTION

Figure 2:
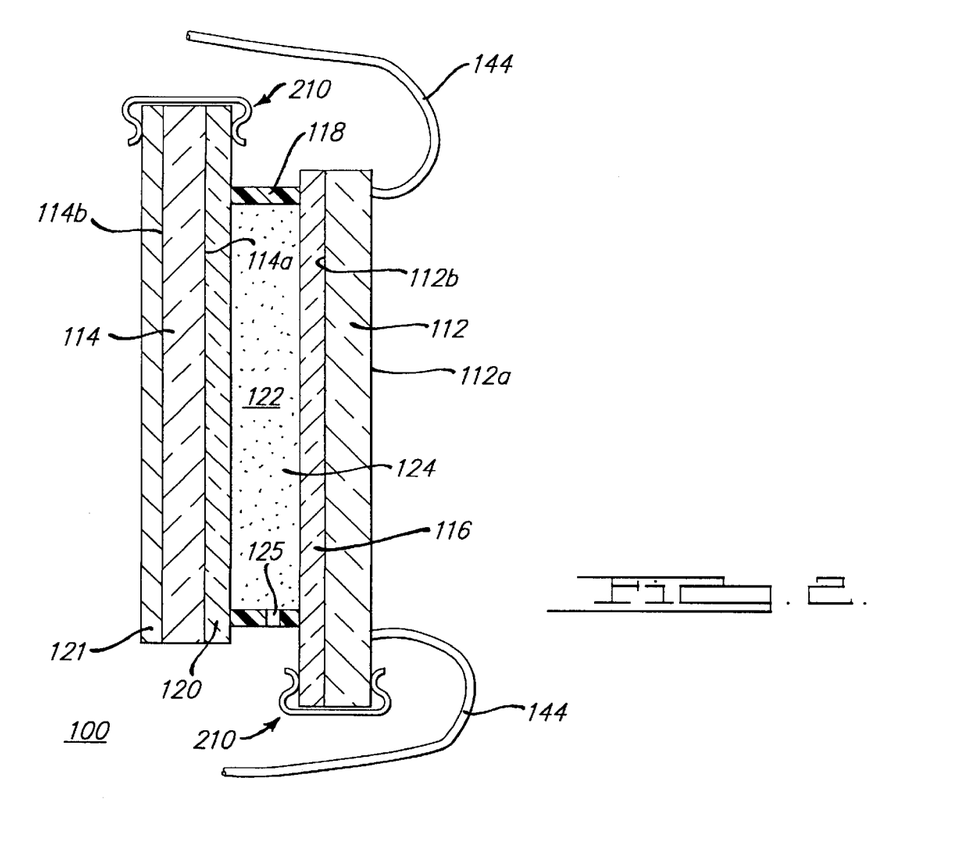
FIG. 2 is a cross-sectional view of an electrochromic device comprising the improved conductive clip that is used to supply potential to at least one transparent conductor within the electrochromic device.

FIG. 2 shows a cross-sectional view of an electrochromic device 100 which may be a mirror, a window, a display device and the like. Device 100 has a front transparent element 112 having a front surface 112a and a rear surface 112b, and a rear element 114 having a front surface 114a and a rear surface 114b. Since some of the layers of the device are very thin, the scale has been distorted for pictorial clarity. Also, for clarity of description of such a structure, the following designations will be used hereinafter. The front surface 112a of the front glass element will be referred to as the first surface and the back surface 112b of the front glass element as the second surface. The front surface 114a of the rear glass element will be referred to as the third surface, and the back surface 114b of the rear glass element as the fourth surface.

Front transparent element 112 may be any material which is transparent and has sufficient strength to be able to operate in the conditions, e.g., varying temperatures and pressures, commonly found in the environment where the electrochromic device is used. For example, in the automotive environment the temperature may vary from −40 degrees Fahrenheit to over 140 to 150 degrees Fahrenheit, whereas a display device or a window may not see such extremes. Front element 112 may comprise any type of borosilicate glass, soda lime glass, float glass or any other material, such as, for example, a polymer or plastic, that is transparent in the visible region of the electromagnetic spectrum.

Front element 112 is preferably a sheet of glass with a thickness ranging from 0.017 inch to about 0.4 inch. Rear element 114 must meet the operational conditions outlined above, except that if the electrochromic device 100 is a mirror, rear element 114 does not need to be transparent, and therefore may comprise polymers, metals, glass, ceramics, and preferably is a sheet of glass with a thickness ranging from 0.017 inch to about 0.4 inch. If the electrochromic device 100 is an automotive mirror, the front and rear elements are sometimes thinner than if the electrochromic device is a window because windows are often larger than automotive mirrors and may need the added strength that a thicker transparent element will provide.

One or more layers of a transparent electrically conductive material 116 are deposited on the second surface 112b to act as an electrode. Transparent conductive material 116 may be any material which: bonds well to front element 112 and maintains this bond when the epoxy seal 118 bonds thereto; is resistant to corrosion with any materials within the electrochromic device; is resistant to corrosion by the atmosphere; and has minimal diffuses or specular reflectance, high light transmission, neutral coloration and good electrical conductance. Transparent conductive material 116 may be fluorine-doped tin oxide; tin-doped indium oxide (ITO); a stack of FTO/ITO disclosed anid claimed in co-pending U.S. patent application Ser. No. 08/831,812, now U.S. Pat. No. 5,923,457, entitled "An Improved Electro-Optic Device Including a Low Sheet Resistance, High Transmission Transparent Electrode"; a stack of ITO/metal/ITO (IMI) as disclosed in "Transparent Conductive Multi-Layer Systems for FPD Applications"; by J. Stollenwerk, et al, Digest of Technical Papers for the Society for Information Display's 1995 Display Manufacturing Technology Conference, page 111; and the materials described in above-referenced U.S. Pat. No. 5,202,787, such as TEC 20 or TEC 15, available from Libbey-Owens-Ford Co. (LOF) of Toledo, Ohio. Similar requirements are needed for whatever is deposited onto the third surface 114a, whether it is another layer of transparent conductive material 120 (for windows or for display devices and mirrors with a fourth surface reflector 121) or a combined reflector/electrode.

The coating 120 of the third surface 114a is sealably bonded to the coating 116 on the second surface 112b near their outer perimeters by a sealing member 118. Preferably, sealing member 118 contains glass beads (not shown) to hold transparent elements 112 and 114 in a parallel and spaced apart relationship while the seal material cures. Sealing member 118 may be any material which is capable of adhesively bonding to the coatings on the second surface 112b to the coatings on the third surface 114a to seal the perimeter such thit electrochromic material 124 does not leak from chamber 122, while simultaneously maintaining a generally constant distance therebetween. Optionally, the layer of transparent conductive coating 116 and the layer on the third surface 120 (transparent conductive material or reflector/electrode) may be removed over a portion where sealing member is disposed (not the entire portion, otherwise the drive potential could not be applied to the two coatings). In such a case, sealing member 118 must bond well to glass.

Chamber 122 is defined by one or more layers of transparent conductive material 116 (disposed on the second surface 112b), another layer disposed on the third surface 114a comprising either a transparent conductive material 120 or a combination reflector/electrode, and an inner circumferential wall of sealing member 118. A bezel 144 extends around the edge of the electrochromic device 100 and comes into contact with the first surface 112a at a point such that the seal member 118 is hidden from view.

Figure 3A:
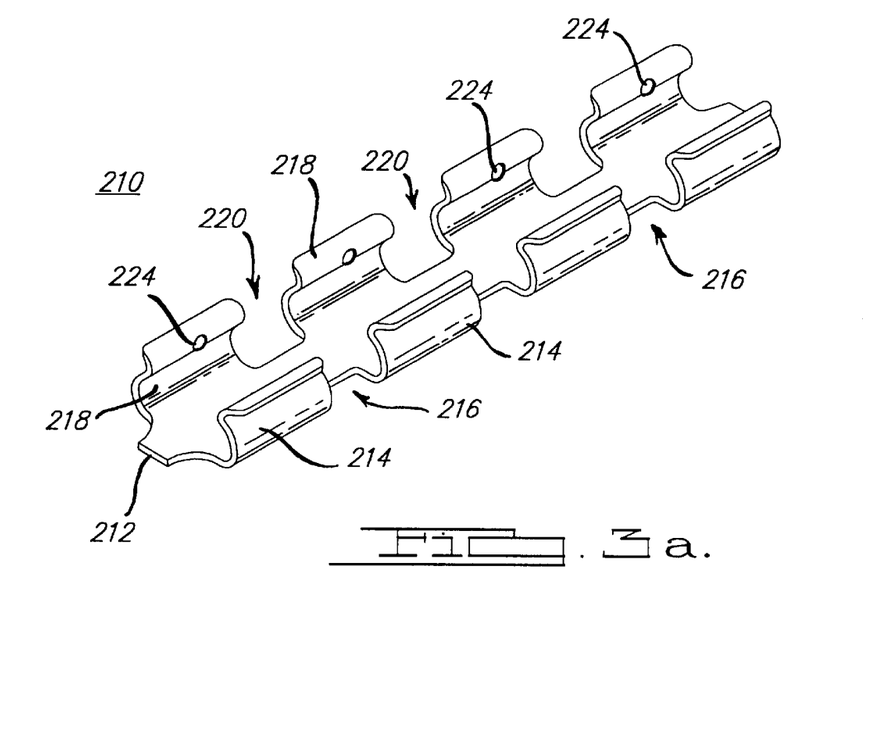
FIGS. 3a and 3b are perspective and cross-sectional views, respectively, of the improved clips comprising a dimple in accordance with the present invention.

In accordance with the present invention, a potential is supplied from a power source to the layer or layers of transparent conductive materials (116 and/or 120) within the electrochromic device 100 through improved clips 210. FIG. 3a shows a perspective view of a clip schematically illustrating an elongated unitary member 210 having a resilient backwall section 212 connecting a plurality of first resilient sections 214 separated from one another by a plurality of recesses 216 and a plurality of second resilient sections 218 laterally spaced from the plurality of first resilient sections 214 and separated from one another by a plurality of recesses 220. Each of the first resilient sections 214 has at least one dimple 222 (see FIG. 3b) adapted to bear against a layer of a transparent conductive material that is disposed on a surface of an electrochromic device 100 (see FIG. 2), and each of the second resilient sections 218 optionally has at least one dimple 224 adapted to bear against another surface of said electrochromic device. If the second resilient sections 218 do not have at least one dimple, then the second resilient sections 218 themselves are adapted to bear against another surface of the electrochromic device.

Figure 3B:
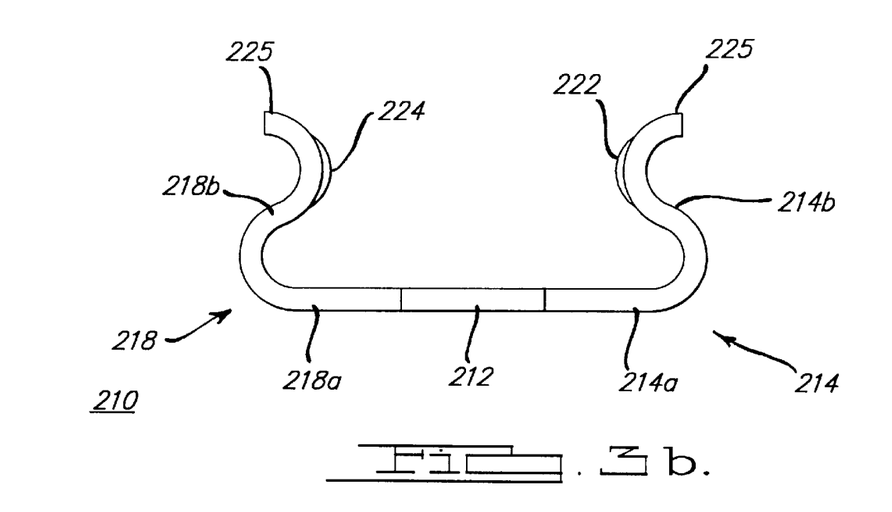

The dimples (222 and/or 224) contact the metal oxide tnansparent conductor and concentrate the contact force, thereby providing superior electrical contact. The dimples extend toward the inside of the second subsections (214b and 218b) and may have a round, oval, elliptical, etc., cross-section. The size of the dimples may also vary, however, a radius of approximately 0.010 inch works very well in the context of an electrochromic mirror. Any non-flat design which concentrates the contact force would accomplish the stable contact performance, and is therefore included as a dimple within the meaning of the present invention.

As can be seen from FIG. 3b, the first and second resilient sections (214 and 218) are integrally connected with the resilient backwall section 212 and have first subsections (214a and 218a) that extend in the same plane as the resilient backwall section, as well as laterally-spaced second subsections (214b and 218b) that curve up such that the elongated unitary member 210 generally forms a "C" such that the pressure points of the clip on the substrate generally oppose one another. The second subsections (214b and 218b) each have at the electrochromic device-accepting end 225 bowed portions spaced apart at a distance slightly less than the thickness of the transparent element of the electrochromic device. Since the clip opening is slightly smaller than the thickness of the transparent elements, the clip will exert a force on the transparent element that will aid with electrical connection and keep the clip from falling off. This force is dependent on the clip material properties, the clip material thickness, the clip shape and the initial and final clip throat gap. The bowed portions extend into outwardly flared portions for guiding the clip onto the element or substrate. It will be understood by those skilled in the art that the dimensions of the clip may be varied to fit the particular needs of an electrochromic device.

Referring again to FIG. 2, a bezel 144 extends around the edge of the electrochromic device 100 and comes into contact with the first surface 112a at a point where the seal member 118 is hidden from view. As stated above, prior art clips for electrochromic mirrors contained a groove in the backwall (see FIG. 1). Electrochromic mirrors containing these clips demanded that the bezel extend away from the edge of the transparent elements the distance of the groove (which is approximately 0.007 inch per side) plus some spacing for thermal expansion and contraction. However, as can be seen from the FIGS. 3a and 3b, the resilient backwall section 212 does not have a groove formed therein. This provides significant savings of space along the edge of the elecirochromic device and allows enlargement of the transparent elements 112 and 114 to take up this additional space. Since the transparent elements are larger, the seal member can be moved more toward the periphery of the transparent elements and made wider, or the bezel can be made narrower or both, while still maintaining the same reflective area as before. This proves a significant manufacturing advantage by allowing greater tolerances for hiding the seal member 118 from the view of the vehicle occupants or reducing the bezel width to make the mirror sleeker in appearance.

The elongated unitary member 210 is capable of bending in three directions (i.e., the X, Y and Z axes) and supplying a potential to a layer of transparent conductive material in a stable manner for long periods of time. By stable, we mean that the average resistance of a number of electrical contact points between the clip 210 and a layer of transparent conductive material does not change significantly when exposed to heat and humidity. A useful test that may be used to determine the stability of the electrical connection between a clip and a metal oxide entails measuring the resistance using a digital multimeter of a series of electrical connections that loops the pathway of potential from the clip to a metal oxide layer, through the metal oxide layer, back to another clip and to another metal oxide layer, etc. (repeat several times), while the temperature and humidity are being cycled. One such test starts the part out at approximately 25 degrees Celsius with an uncontrolled humidity for 0.5 hour, then ramps the part to approximately 65 degrees Celsius and approximately 95% relative humidity over a period of 0.5 hour. The part is held there for approximately 5 hours. The temperature is then ramped to approximately 85 degrees Celsius with an uncontrolled humidity over a period of 0.5 hour and held there for approximately 4 hours. The temperature is ramped to approximately minus 40 degrees Celsius with an uncontrolled humidity over a period of 0.5 hour and held there for approximately 2 hours. Finally, the cycle begins to repeat when the temperature is ramped to approximately 25 degrees Celsius at an uncontrolled humidity over a period of 0.5 hour. We have found that this test gives a reasonable indication of how the clip will perform in the field.

The clip contact must be stable for long periods of time which will differ depending on the nature of the electrochromic device. As stated above, electrochromic mirrors must have a lifetime that matches an automobile which is typically about 10 years and sometimes longer. However, electrochromic windows, especially those placed in architectural windows must last the lifetime of a building which may be upward of thirty years. Furthermore, architectural windows are fairly large, e.g., at least 2 square feet, and to avoid uneven coloration and clearing, the clips must make good contact all the way around this large circumference. If the clip contacts are not stable for long periods of time, there is a significant chance that the window will experience uneven coloring and clearing which is aesthetically displeasing to a building occupant and therefore unacceptable. Thus, in the present disclosure a long period of time generally means at least 10 years, and preferably more than about 20 years.

It should be understood that the vast majority of prior art clips deal with making contact to metals. Although mention is made of oxides and the trouble these oxides present in electrical contact, all reference is to oxides on the surface of a metal. Thus, the clips are designed to break through the oxide barrier in order to make good contact to the underlying metal substrate through a variety of mechanisms. One mechanism is to scrape through the oxide by sliding or wiping the contact onto the surface so that adequate contact is made with the underlying metal. Another mechanism is to use either high voltage or high current to "burn" through the oxide so that the potential being provided to the underlying metal substrate remains stable. None of these mechanisms are useful in the electrochromic art because once attached the clips do not move and therefore cannot continually wipe or scrape the oxide away. Also, the contact in the electrochromic art is low voltage (about 1.2 volts) and very low amperage (about 100 milliamperes averaged over many contacts) and therefore there is insufficient voltage or current to effectively "burn" through the oxide. However, the most important reason why none of these mechanisms are useful in the electrochromic art is because contact is being made to a relatively thick layer of a metal oxide, typically either indium oxide doped with tin oxide or fluorine-doped tin oxide, and not to a metal layer coated with a thin oxide layer. Thus, adequate contact must be made to the very layer that the prior art has sought to avoid—the metal oxide layer.

As is known in the art, sliding contacts can be coated with lubricants, greases and the like to decrease oxide build-up on the metal contact and to lubricate the moving metal contact area during thermal cycling. In the electrochromic art, however, certain materials may not be as useful because they may become mobile as the temperature rises. For example, in automobiles it is common for the interior of the vehicle to reach upward of 140 to 150 degrees Fahrenheit. At these temperatures, greases may start to run and flow down the outside of the glass element and impede the occupants rear view. We have found that WD-40, available from the WD-40 Company, San Diego, Calif., when applied during the manufacturing process of these clips or after the clips have been formed but before the clips have been attached to the electrochromic device, provides significant corrosion protection even after the mineral spirit base has evaporated. Although not wanting to be held to any specific theory, it is presently believed that the mineral spirits evaporate and leave behind antioxdants dissolved in the mineral spirits. Other commercially available lubricants that may be useful in certain electrochromic device applications include Anderol 732, available from Nuodex Inc., Piscataway, N.J.; NS-10195-G7, available from Syn-Tech, Addison, Ill.; and Nyetact 5026 and Nyogel 760G, available from Nye Lubricants, New Bedford, Mass.

The clip may also be fabricated from a variety of materials that possess sufficient resiliency, strength, conductivity, along with good formability and good corrosion resistance, such as those skilled in the art will appreciate. Resiliency and strength are important so that the clip will bend and engage the coated transparent element of the electrochromic device and continue to exert a force on the layer of transparent conductive material. All other things being equal, the more force exerted by a clip, the more stable the electrical contact. Material properties, material thickness, clip shape and the clip gap displacement all influence contact force. Strength is not the sole factor in clip material selection. The typical clip shape is intricate and the material must also be capable of being bent to a radius that may be less than the material thickness for some clip designs. Furthermore, the conductivity must be sufficient to allow adequate clearing and coloring of the electrochromic device. As a general rule for an inside electrochromic mirror shape, the resistance across the length of a clip of about 10 inches must be less than about 0.5 ohm or else there will be uneven coloring or clearing. Finally the clip must not excessively corrode over time such that its conductivity changes significantly over the clip's expected lifetime.

Materials usefull in making the clips are tin-coated beryllium/copper alloys, such as C17200-290 with a TM02 temper or C174-10 with a ½ HT temper, both available from Brush-Wellman, Inc., Cleveland, Ohio, as well as a tin-plated beryllium-free copper alloy, such as 7025 with a TM02 temper, available from Olin Corporation, East Alton, Ill. Other materials that may be used are ½ hard brass, phosphor bronze, or non-copper containing metils, such as CMI-B Si steel, available from Cold Metal Products, Inc., Waterbury, Conn., stainless steel, or high strength low alloy steels, such as ASTM A586 and ASTM 109, available from Thomas Steel Strip Corporation, Warren, Ohio. High strength low alloy (HSLA) steels have surprisingly good electrical conductivity, good formability and excellent strength. Clips shaped similarly to the shape indicated in FIG. 1 (ribbed design) were made with 0.006" thick HSLA steel from Thomas Steel Strip Corporation with the following properties:

|  |  | Analysis (wt. %) |  |
| --- | --- | --- | --- |
| Hardness Rockwell 15T | 91 | C .070 | Al .048 |
| Yield Strength | 119 KSI | Mn 1.34 | Si .034 |
| Ultimate Strength | 123 KSI | P .018 |  |
| % Elongation in 2" | 1.80 | S .004 |  |

The clips exhibited excellent spring properties and the material formed to the complex shape. The resistance of a 10" clip length was approximately 0.12 ohm well below the 0.5 ohm performance threshold. Typical HSLA steels are specified by ASTM A572, A588, A607, A633, A656, A715, A808, A606, A749, A812, A568 and SAE J1392. HSLA steels typically contain small amounts of alloying elements, such as Cb, Cr, Cu, Mo, Ni, Si, Ti, V, Zr, either singly or in combination to achieve their strength. These steels are typically low in carbon content, usually below 0.2%. Iron-silicon steel will also perform well in a clip application. A ribbed clip shape made of 0.005" thick silicon steel from Cold Metal Products has the following properties:

|  |  | Analysis (wt. %) |  |
| --- | --- | --- | --- |
| Tensile Strength (KSI) | 143.5 | Al .30 | P .04 |
| Elongation (%) | .5 | C .005 | S .01 |
| Hardness | RB-92 | Mn .5 | Si .35 |

Figure 5:
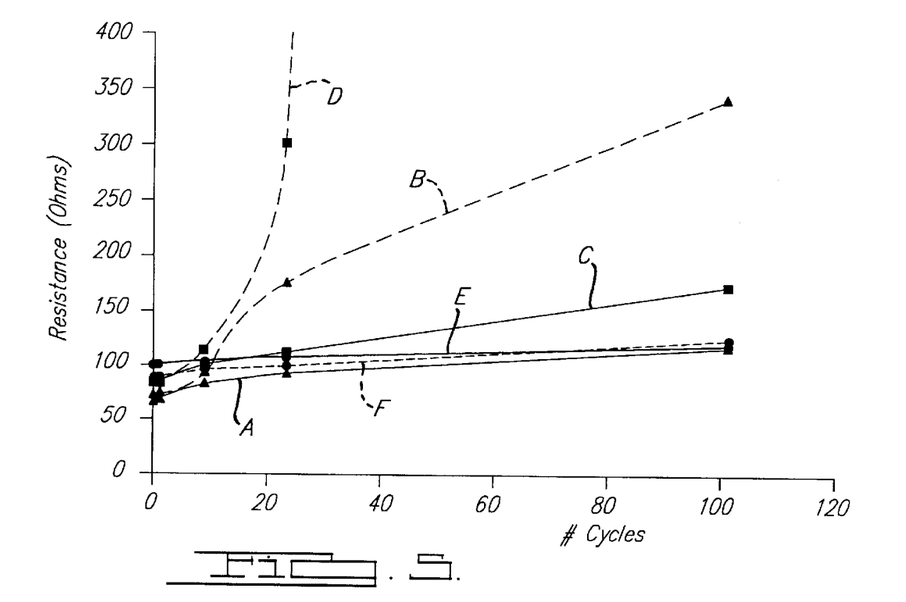

These silicon steel clips exhibited excellent spring properties and contact force (see FIG. 6) and exceptionally stable electrical properties in plated and unplated forms (see FIG. 5). The exposed surface of an uncoated steel bus clip will appear quite corroded and rusty, yet the contact resistance to a metal oxide electrode will be stable. This corrosion can be substantially retarded by coating the clip with an antioxidant or lubricant, such as WD-40 or Nye grease, or it may be plated with tin or more preferably with a nickel-based coat and then tin dip or plated top coat or both. Silicon steels can be made with very high silicon content (5%) but as the silicon content increases cold working becomes more difficult and high silicon content silicon steels may not form well into intricate clip shapes.

Typically, any of the above metals are plated in large coils, slit to width, stamped to shape and form. This exposes unplated metal on the clip edge which can corrode. These edges can be coated with an antioxidant or grease or coating, or the metal clips can be plated after forming so all exposed metal will be covered. If tin coatings are used, they may be applied in a molten tin dip or by a tin electroplate. The tin may have a thickness that ranges significantly, but it is typically from about 0.00002 to about 0.00008 inch.

Figure 4:
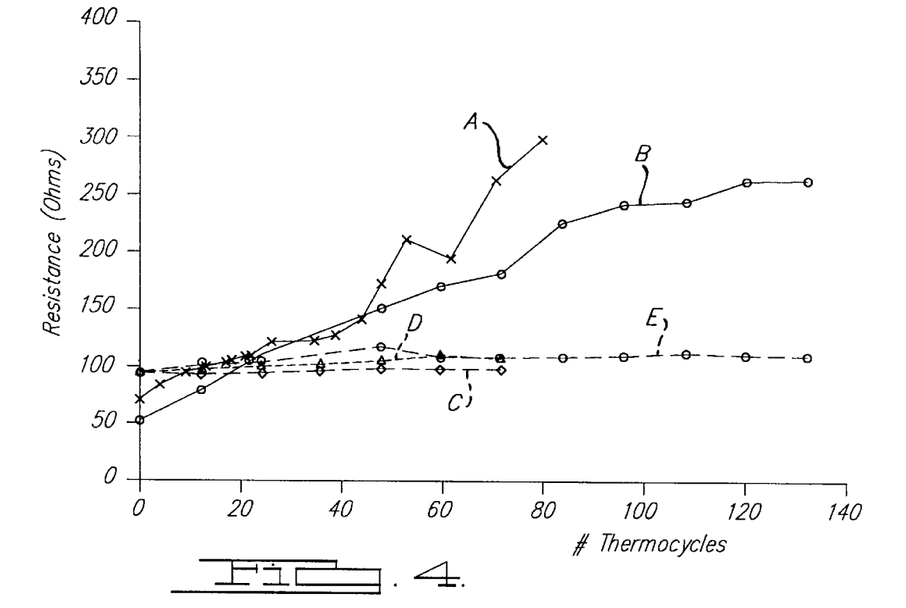
FIGS. 4 and 5 are graphs plotting the resistance versus the number of cycles for various clips that were exposed to thermal and humidity cycling.

FIGS. 4 and 5 contain data on the average clip-contact resistance versus the number of above-described temperature and humidity cycles for clips of various designs, materials and treatments. FIG. 4 shows the resistance versus the number of cycles for a prior art, ribbed, clip (see FIG. 1) comprising tin-plated high (approx. 2%) beryllium/copper alloy C17200-290 (Curve A), a clip with a groove-free backwall design comprising a tin-plated beryllium-free copper alloy (without any dimples) (Curve B), two groove-free backplate clip designs with dimples comprising tin-plated and tin-dipped low (approx. 0.2%) beryllium/copper alloys C174-10 (Curves C and D, respectively), and a groove-free backplate clip design (with dimples) tin-plated beryllium-free copper alloy 7025 (Curve E). As can be seen in Curve A, the prior art clip design had one of the lowest initial resistances of approximately 65 ohms, but after approximately 50 cycles, the resistance of the clip rose to an unacceptable level (with a final average resistance of some test samples reaching approximately 720,000 ohms). In the context of the present invention, it should be understood that a resistance of approximately 400 ohms (or greater) is unacceptable. Curve B shows that the beryllium-free copper alloy also had an initially low resistance, but the resistance approached an unacceptable level. Curves C, D and E all show various clip designs having dimples. Although the initial resistance is slightly higher than the prior art designs, the resistance remained essentially constant throughout the entire test cycle, indicating that they provide a stable contact with a metal oxide for long periods of time.

FIG. 5 shows the resistance versus the number of cycles for a prior art clip (i.e., having a ribbed or grooved back) comprising tin-plated beryrium/copper alloy C17200-290 with and without WD-40 being applied after the metal forming process (Curves A and B, respectively), a ribless clip (i.e., have a groove-free backplate design), having no dimples, and comprising a tin-plated beryllium-free copper alloy with and without WD-40 being applied after the metal forming process (Curves C and D, respectively), and a groove-free, dimple-free backplate clip design comprising a silicon steel alloy, such as CMI-B, with and without application of WD-40 after the metal forming process (Curves E and F, respectively). Again, it can be seen that the clips without dimples and comprising beryllium and beryllium-free copper alloys became unacceptable after just a short period of time when no WD-40 was applied and were reasonably stable when WD-40 was applied. The clip in Curve A had a thickness of approximately 0.005 inch and did not have a shape that was designed to optimize the contact force. It is expected that if the design was optimized, the performance would improve, but would not equal the performance of the clips containing dimples. The silicon steel alloy performed adequately (even without dimples) with and without WD-40 being applied, however, the samples were corroded after the test. It is believed that the new high strength low alloy materials will maintain the stable contact with the metal oxide layer and further will not corrode to such a degree that the clip will not work properly, however, it is still desirable to retard corrosion.

Again, it can be seen that the clips without dimples and comprising beryllium and beryllium-free copper alloys became unacceptable after just a short period of time when no WD-40 was applied and were reasonably stable when WD-40 was applied. The clip in Curve A had a thickness of approximately 0.005 inch and did not have a shape that was designed to optimize the contact force. It is expected that if the design was optimized, the performance would improve, but would not equal the performance of the clips containing dimples. The silicon steel alloy performed adequately (even without dimples) with and without WD-40 being applied, however, the samples were corroded after the test. It is believed that the high strength low alloy steels will maintain tile stable contact with the metal oxide layer and further will not corrode to such a degree that the clip will not work properly, however, it is still desirable to retard corrosion.

Table 1 shows extrapolated resistances for 63 tooth/10 inch clips comprised of various materials. These extrapolated values were calculated based on Background Corrected resistance of actual 44 tooth/approximately 7 inch clips. The beryllium/copper alloys have adequate resistances both when plated and when unplated, as do the beryllium-free copper alloys and the silica steel alloys. Stainless steels do not have adequate resistances for use in an electrochromic mirror, although the resistance could be lowered with a very thick electroplated or dipped layer of a conductive material such as tin. The HSLA steels were only tested as plated and have adequate resistance for use in an electrochromic mirror.

TABLE 1

| | Tin Plated | | Unplated (Base Metal Only) | |
|---|---|---|---|---|
| Material: | Resistance (ohms) | Material: | Resistance (ohms) | |
| 0.005" high Be/Cu C17200-290 | 0.10 | 0.005" high Be/Cu C17200-290 | 0.10 | |
| 0.005" Stainless Steel | 0.74 | 0.005" Stainless Steel | 0.80 | |
| 0.006" Silica Steel | 0.16 | 0.006" Silica Steel | 0.20 | |
| 0.005" 7025 | 0.04 | 0.006" 7025 | 0.04 | |
| 0.005" low Be/Cu 174-10 | 0.04 | | | |
| 0.006" HSLA Steel | 0.14 | | | |

Figure 6:
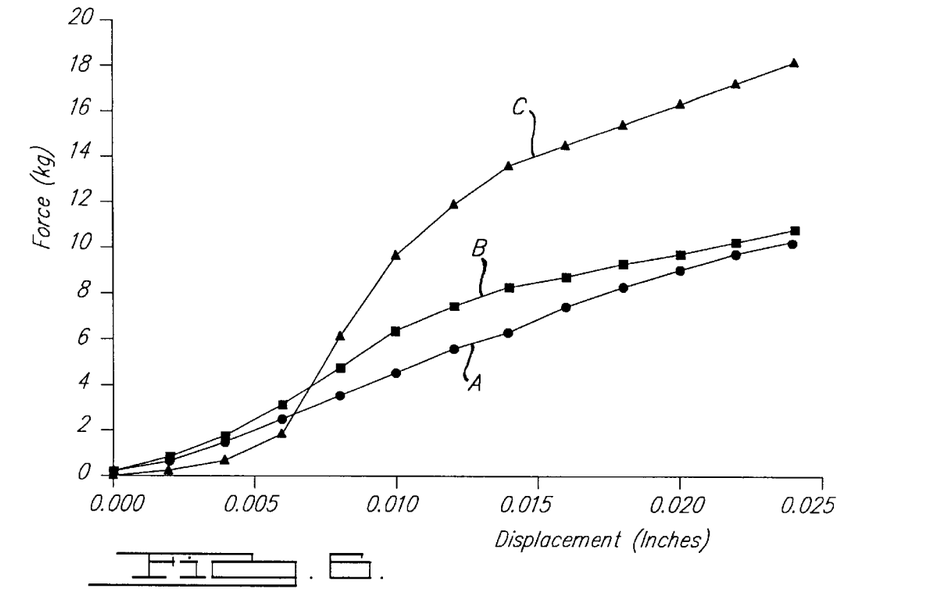
FIGS. 6, 7a and 7b, and 8 are graphs plotting the force versus displacement for clips of varying alloy composition, thickness and design shape, respectively.
Figure 7A:
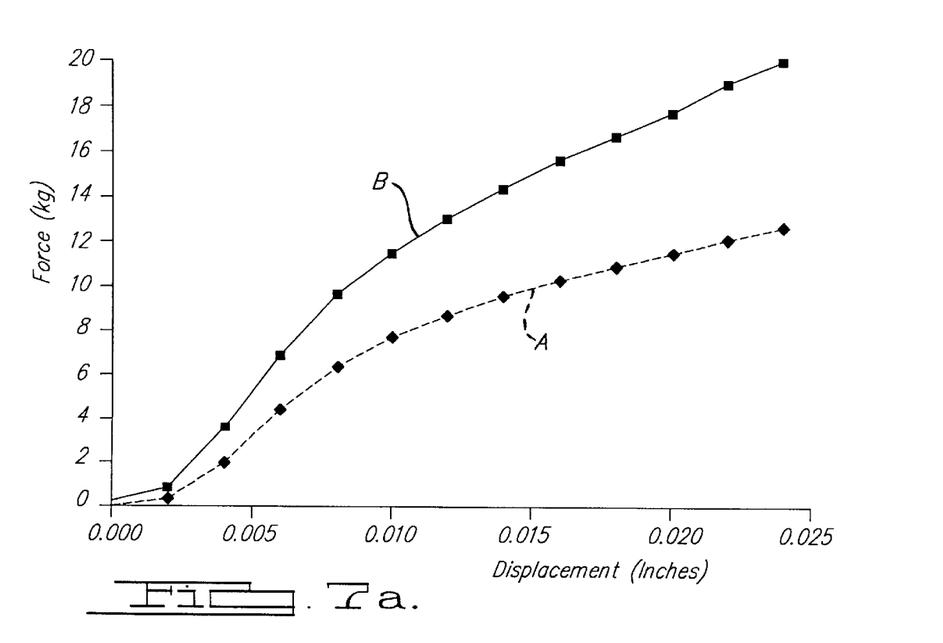
Figure 7B:
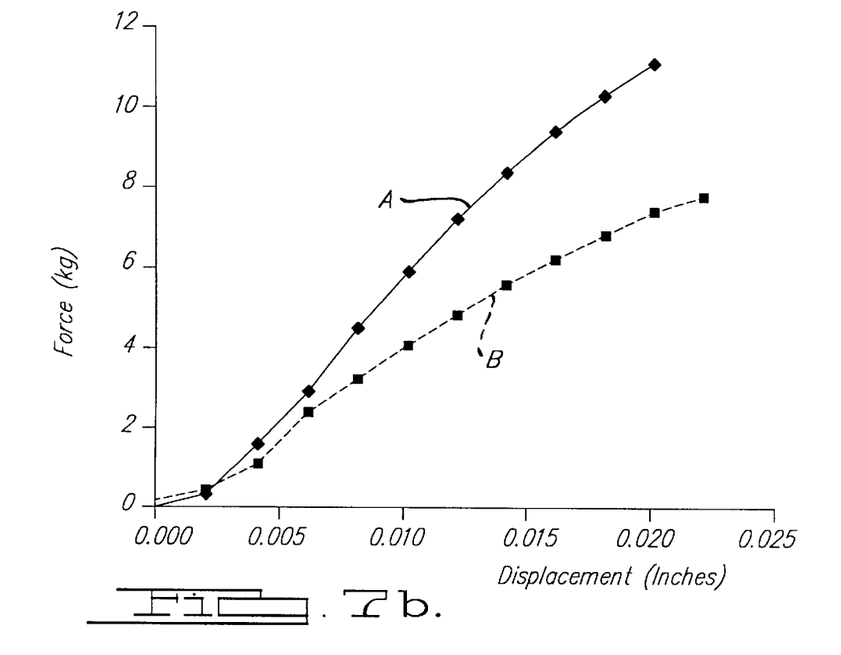
Figure 8:
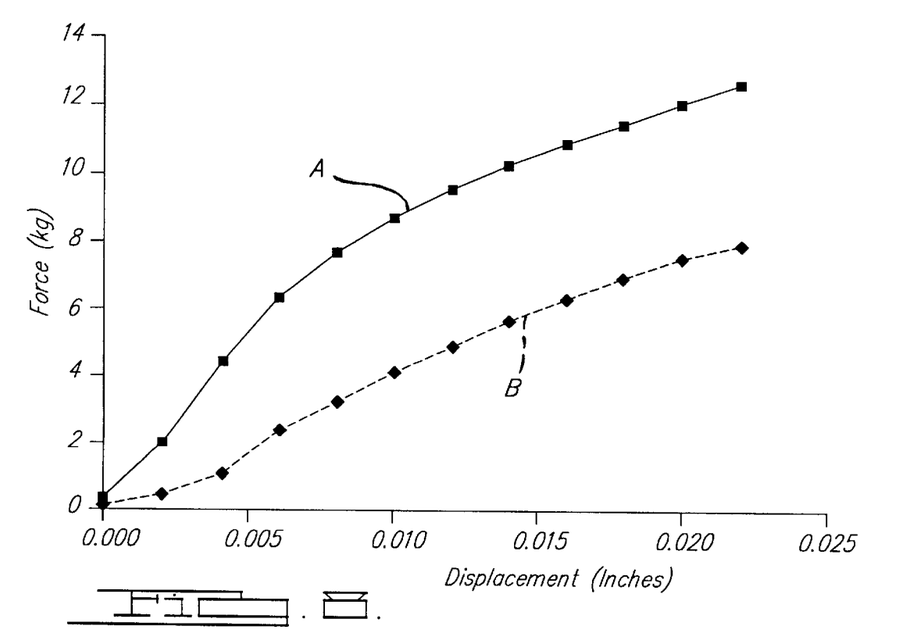

As stated above, clip composition, clip thickness, clip shape and the clip gap displacement all influence contact force, as shown in FIGS. 6 through 8. FIG. 6 shows the force versus the displacement for 0.006 inch thick prior art clips (i.e., having a ribbed or grooved back) comprising a tin-plated low beryllium/copper alloy 174-10 (Curve A), a tin-plated beryllium-free copper alloy 7025 (Curve B), and a CMI-B Silicon steel (Curve C:). As shown, the silicon steel clip provides the highest contact force followed by the beryllium-free copper alloy and the low beryllium/copper alloy. FIG. 7a shows the force versus displacement for two prior art ribbed clips comprising a tin-plated beryllium-free copper alloy 7025 having thicknesses of 0.005 inch (Curve A) and 0.006 inch (Curve B), respectively. Although it is clear that the thicker clip has a higher contact force, it must be kept in mind that a thicker clip also uses more material and is therefore more expensive. It should also be noted that beryllium is a toxic material and must be handled carefully when producing the beryllium/copper alloys and in subsequent processing. Consequently even small beryllium levels increases the base metal cost substantially. Because beryllium is so effective in improving the strength and spring properties of copper based alloys while preserving its electrical conductivity, it is widely used in critical electronic applications in spite of its toxicity and high cost. FIG. 7b shows a prior art clip shape made with 0.005 inch thick high beryllium/copper alloy C17200-290 (Curve A) compared to the same shape clip with 0.005 inch thick 7025 beryllium-free copper alloy (Curve B). As can be seen, the high beryllium copper alloy has a higher contact force than the beryllium-free alloy. However, because of the high cost and toxicity it is therefore desirable to achieve good clip performance without using beryllium to enhance the strength and spring properties of the clip material. FIG. 8 shows the force versus displacement for two clips comprising 0.005 inch thick tin-plated beryllium-free copper alloy 7025 with a ribless design (Curve A) and a ribbed design (Curve B). As can be seen, the ribless design has a higher contact force than the ribbed design. The ribless design provides a significant improvement over the ribbed design, especially for beryllium-free copper alloys like 7025, because this shape exerts over 20 percent more contact force for a given displacement than the ribbed design.

Figure 9:
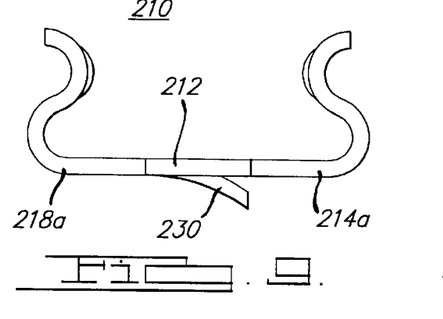
FIG. 9 is a cross-sectional view of a clip according to the present invention including a snag capable of grabbing the bezel of an electrochromic device.
Figure 10:
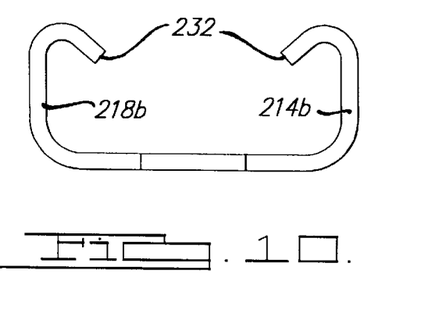
FIG. 10 is a cross-section view of a clip according to the present invention having a design that is capable of grabbing the transparent element of an electrochromic device.

The clip of the present invention may optionally contain features included into either the backwall section 212 or the first or second sections (214 and/or 218) that allow the clips to snag the bezel 144 of an electrochromic mirror to more effectively hold the mirror element to the bezel, or to snag the glass element of an electrochromic device to more effectively hold the clip on the transparent element. FIG. 9 shows how there may be snags 230 disposed in the resilient backwall section 212 or optionally in either of the first subsections (214a and 218a) that protrude away from the backwall section 212 (or optionally subsections 214a and 218a). These snags 230 allow the clip 210 to engage the bezel 144 and help hold the bezel 144 to the rest of the electrochromic device. Alternatively, the clip may have the design shown in FIG. 3 at most of the first and second resilient sections, but at every 2nd, 3rd, 4th, etc. position, the first and second resilient section may have a different design capable of snagging or gripping the glass such that it should be much harder for the clip to come back off the transparent element. FIG. 10 shows one sample design of how this snag may be shaped, where the edge 232 of the flared-in portion of the laterally-spaced second subsections (214b and 218b) will slide onto the transparent element but will engage the transparent element to such an extent that any removal force will cause this edge 232 to dig into the glass and inhibit removal of the clip.

Referring again to FIG. 2, it can be seen that the two glass elements are offset from one another. This offset region provides significantly more "dead space " on one side of each of the glass elements than on the other side, which can be used for clips having a non-symmetrical design, such as those shown in FIGS. 11a to 11d. It is desirable to maintain a low clip profile on the front and rear of an element so a bulky bezel or back design is not required to cover the clip. The clip maintains its contact pressure by spring force. The clip design must have enough "bulk " or metal strength to maintain its clamping force when it is forced onto a substrate that is thicker than the initial throat gap. In general, the more or larger the metal shape used in a clip form, the more the clip will spread before the metal irreversibly yields or tears.

Figure 11A:
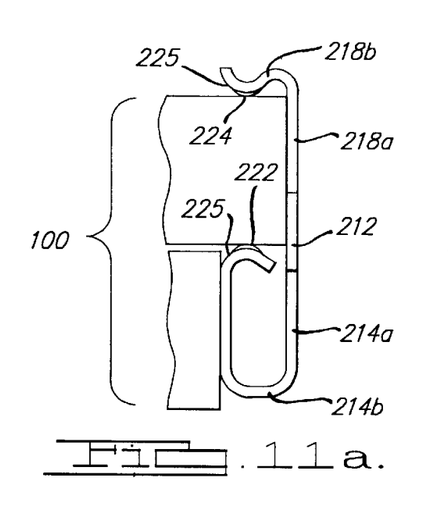
FIGS. 11a to 11d are cross-sectional views of various asymmetrical clip designs of the present invention.
Figure 11B:
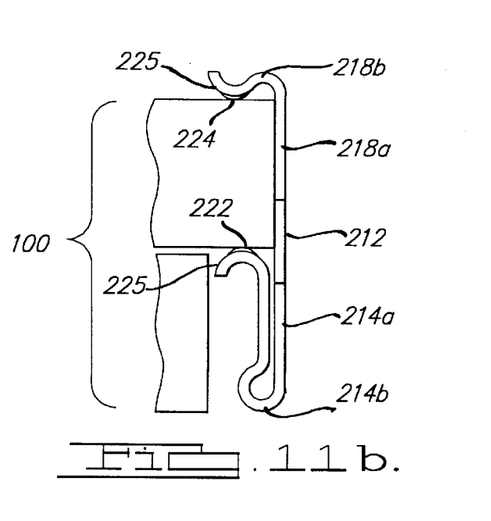
Figure 11C:
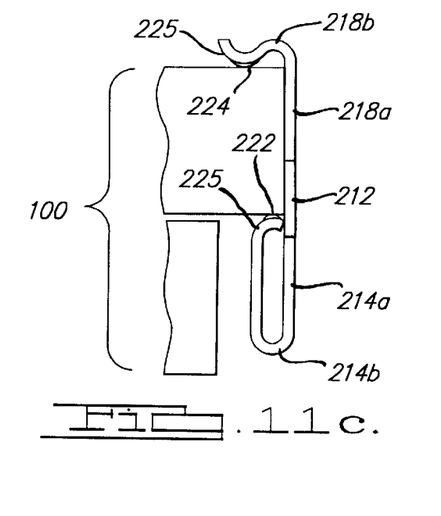
Figure 11D:
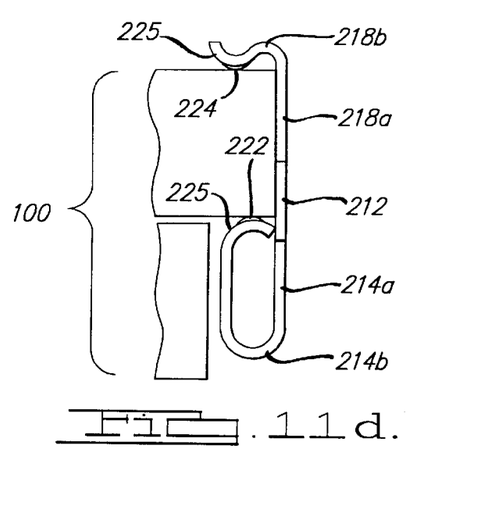

The optimum clip shape for minimizing bulk on the front and back, and maximizing the spread to yield value, is a non-symmetrical shape that utilizes this "dead zone" for clip shape bulk. The non-symmetrical clips are similar in design to the clips of FIGS. 3a and 3b in that they are comprised of an elongated unitary member 210 having a resilient backwall section 212 connecting a plurality of first resilient sections 214 separated from one another by a plurality of recesses 216, and a plurality of second resilient sections 218 laterally spaced from the plurality of first resilient sections 214 and separated from one another by a plurality of recesses 220. Each of the first resilient sections 214 has at least one dimple 222 (see FIG. 3b) adapted to bear against a layer of a transparent conductive material that is disposed on a surface of an electrochromic device (see FIG. 2) and each of the second resilient sections 218 is adapted to bear against another surface of said electrochromic device and optionally has at least one dimple 224. As shown in FIG. 11a, they differ in that the first resilient subsections (214a and 218a) that are integrally connected with the resilient backwall section 212 and extend in the same plane as the resilient backwall section are longer than the corresponding subsections of the clip in FIG. 3. Also, one of the second subsections (214b) curves up and then curves back so that it is parallel with the first subsection 214a and then bows in at the electrochromic device-accepting end 225. The bowed end has an inwardly flared portion for guiding the transparent element. FIG. 11b shows that the portion of the second resilient subsection 214b may curve up and then curve back before curving to become parallel with the first subsection 214a. This will allow the bowed end to have an outwardly flared portion at the electrochromic device-accepting end 225 for guiding the transparent element. Those skilled in the art will understand that by using the teachings of the present invention, there are a plethora of designs for both the symmetrical and non-symmetrical clips, and all such designs should be understood to be within the scope of the present invention.

For electrochromic mirrors, light rays enter through the front glass 112, the transparent conductive layer(s) 116, the at least one electrochromic material in chamber 122, the transparent conductive layer 120 and the back glass element 114, before being reflected from the reflector 121 provided on the fourth surface 114b of the mirror 110. Light in the reflected rays exit by the same general path traversed in the reverse direction. Both the entering rays and the reflected rays are attenuated in proportion to the degree to which the electrochromic medium 124 is light absorbing. Alternatively, as stated above, the reflector may be placed on the third surface 114a in accordance with the disclosure of U.S. patent application entitled "Electrochromic Rearview Mirror Incorporated A Third Surface Metal Reflector" filed on or about Apr. 2, 1997. The entire disclosure of this U.S. patent application is hereby incorporated herein by reference. In this case the third surface reflector doubles as an electrode and the transparent conductive layer 120 may optionally be deleted. Further, if the reflector is placed on the third surface 114a, a heater 138 may be placed on the fourth surface 114b in accordance with the teachings in the immediately above-referenced U.S. patent application.

The at least one electrochromic material may be a wide variety of materials capable of changing properties such that light traveling therethrough is attenuated, but must be capable of being dissolved in the solvent. In order to balance charge during the electrochromic reactions, another redox active material must be present. This other material may include solution-phase redox, solid state, and metal or viologen salt deposition; however, solution-phase redox is presently preferred, such as those disclosed in above-referenced U.S. Pat. Nos. 4,902,108; 5,128,799; 5,278,693; 5,280,380; 5,282,077; 5,294,376; and 5,336,448.

As stated above, electrochromic devices embodying the present invention preferably include a bezel 144, which extends around the entire periphery of each individual assembly 100. The bezel 144 conceals and protects the spring clips and the peripheral edge portions of sealing member 118 and both the front and rear glass elements 112 and 114. A wide variety of bezel designs are well known in the art, such as, for example the bezel taught and claimed in above-referenced U.S. Pat. No. 5,448,397. There are also a wide variety of housings well-known in the art for attaching the mirror assembly 100 to the inside front windshield of an automobile, or for attaching outside mirror assemblies to the outside of an automobile. A preferred housing for attaching an inside assembly is disclosed in above-referenced U.S. Pat. No. 5,337,948.

The electrical circuit preferably incorporates an ambient light sensor (not shown) and a glare light sensor (not shown), the glare light sensor being positioned either behind the mirror glass and looking through a section of the mirror with the reflective material completely or partially removed, or the glare light sensor can be positioned outside the reflective surfaces, e.g., in the bezel 144.

While the invention has been described in detail herein in accordance with certain preferred embodiments thereof, many modifications and changes therein may be affected by those skilled in the art without departing from the spirit of the invention. Accordingly, it is our intent to be limited only by the scope of the appending claims and not by way of the details and instrumentalities describing the embodiments shown herein.

What is claimed:

1. An improved conductive clip for supplying potential to an electrochromic device, comprising an elongated unitary member having a resilient backwall section integrally connecting a plurality of first resilient sections separated from one another by a plurality of recesses and a plurality of second resilient sections laterally spaced from said plurality of first resilient sections and separated from one another by a plurality of recesses, where at least one of said first resilient sections has at least one dimple adapted to bear against a transparent conductor-coated surface of an electrochromic device, and where each of said plurality of second resilient sections is adapted to bear against another surface of said electrochromic device, where said unitary member is capable of supplying a potential to said transparent conductor.

2. The clip of claim 1, wherein said resilient backwall section and said first and second resilient sections have recesses that allow said elongated member to bend in three directions.

3. The clip of claim 1, wherein said elongated member is coated with a lubricant, an antioxidant, or both said lubricant and said antioxidant.

4. The clip of claim 1, wherein said elongated member further includes a bezel snag for engaging a bezel of said electrochromic device.

5. The clip of claim 1, wherein said second resilient section includes at least one dimple adapted to bear against said another surface of said electrochromic device.

6. The clip of claim 1, wherein said elongated member further includes a glass snag for engaging a transparent element whose surface is coated with said transparent conductor.

7. The clip of claim 1, wherein said first and second resilient sections have first subsections that extend in the same plane as said backwall section, and further where said first and second resilient sections have second subsections that curve such that said elongated unitary member generally forms a "C" shape.

8. The clip of claim 7, wherein each laterally-spaced pair of said second subsections have at an electrochromic device-accepting end bowed portions that each extend into outwardly flared portions.

9. The clip of claim 8, wherein said bowed portions are spaced apart at a distance slightly less than a thickness of a transparent element whose surface is coated with said transparent conductor.

10. The clip of claim 7, wherein at least one laterally-spaced pair of said second subsections have at said electrochromic device-accepting end generally straight portions that each extend into inwardly flared portions.

11. The clip of claim 10, wherein said inwardly flared portions are spaced apart at a distance slightly less than a thickness of a transparent element whose surface is coated with said transparent conductor, such that said inwardly flared portions slide onto said transparent element, but engage said transparent element if a removal force is applied to said clip.

12. The clip of claim 1, wherein said clip is comprised of a material selected from the group consisting of: beryllium-free copper alloys; HSLA steels; and Silicon steels.

13. The clip of claim 1, wherein said clip has a non-symmetrical shape.

14. An improved conductive clip for supplying potential to an electrochromic device, comprising an elongated unitary member having a resilient backwall section integrally connecting a plurality of first resilient sections separated from one another by a plurality of recesses and a plurality of second resilient sections laterally spaced from said plurality of first resilient sections and separated from one another by a plurality of recesses, where each of said plurality of first resilient sections is adapted to bear against a transparent conductor-coated surface of an electrochromic device, and where each of said plurality of second resilient sections is adapted to bear against another surface of said electrochromic device, where said unitary member further comprises a bezel snag for engaging a bezel of said electrochromic device.

15. The clip of claim 14, wherein said bezel protrudes away from said backwall section.

16. The clip of claim 15, wherein said elongated member further includes a glass snag for engaging a transparent element with said transparent conductor-coated surface.

17. The clip of claim 15, wherein said first resilient section includes at least one dimple adapted to bear against said transparent conductor-coated surface of said electrochromic device and where said unitary member is capable of supplying a potential to said transparent conductor.

18. The clip of claim 15, wherein said clip is comprised of a material selected from the group consisting of: beryllium-free copper alloys; HSLA steels; and silicon steels.

19. The clip of claim 15, wherein said clip has a non-symmetrical shape.

20. An improved conductive clip for supplying potential to an electrochromic device, comprising an elongated unitary, member having a resilient backwall section integrally connecting a plurality of first resilient sections separated from one another by a plurality of recesses and a plurality of second resilient sections laterally spaced from said plurality of first resilient sections and separated from one another by a plurality of recesses, where each of said plurality of first resilient sections is adapted to bear against a transparent conductor-coated surface of an electrochromic device, and where each of said plurality of second resilient sections is adapted to bear against another surface of said electrochromic device, where said unitary member further comprises a glass snag for engaging a transparent element with said transparent conductor-coated surface.

21. The clip of claim 20, wherein said glass snag is made up of at least one laterally-spaced pair of said first and second sections that have at an electrochromic-device accepting end generally straight portions that each extend into inwardly flared portions and where said inwardly flared portions are spaced apart a distance slightly less than a thickness of said transparent element.

22. The clip of claim 21, wherein said elongated member further includes a bezel snag for engaging a bezel of said electrochromic device.

23. The clip of claim 21, wherein said first resilient section includes at least one dimple adapted to bear against said transparent conductor-coated surface of said electrochromic device and where said unitary member is capable of supplying a potential to said transparent conductor.

24. The clip of claim 21, wherein said clip is comprised of a material selected from the group consisting of: beryllium-free copper alloys; HSLA steels; and silicon steels.

25. The clip of claim 21, wherein said clip has a non-symmetrical shape.

26. An improved conductive clip for supplying potential to an electrochromic device, comprising an elongated unitary member having a resilient backwall section integrally connecting a plurality of first resilient sections separated from one another by a plurality of recesses and a plurality of second resilient sections laterally spaced from said plurality of first resilient sections and separated from one another by a plurality of recesses, where each of said plurality of first resilient sections is adapted to bear against a transparent conductor-coated surface of an electrochromic device, and where each of said plurality of second resilient sections is adapted to bear against another surface of said electrochromic device, where said unitary member is comprised of a material selected from the group consisting of: beryllium-free copper alloys; HSLA steels; and silicon steels.

27. The clip of claim 26, wherein said first resilient section includes at least one dimple adapted to bear against said transparent conductor-coated surface of said electrochromic device and where said unitary member is capable of supplying a potential to said transparent conductor.

28. The clip of claim 27, wherein said elongated member is coated with a lubricant, an antioxidant, or both said lubricants said antioxidant.

29. The clip of claim 27, wherein said elongated member further includes a bezel snag for engaging a bezel of said electrochromic device.

30. The clip of claim 27, wherein said elongated member further includes a glass snag for engaging a transparent element with said transparent conductor-coated surface.

31. The clip of claim 27, wherein said clip has a non-symmetrical shape.

* * * * *